United States Patent
Guzman Escalante et al.

(10) Patent No.: US 10,731,611 B2
(45) Date of Patent: Aug. 4, 2020

(54) FUEL RAIL DAMPER WITH LOCATING FEATURES

(71) Applicant: Robert Bosch GmbH, Stuttgart (DE)

(72) Inventors: Alfonso Emmanuel Guzman Escalante, San Luis Potosi (MX); Josue Israel Chavez Mendoza, San Luis Potosi (MX); John Casari, Manchester, MI (US)

(73) Assignees: Robert Bosch LLC, Broadview, IL (US); Robert Bosch GmbH, Stuttgart (DE)

(*) Notice: Subject to any disclaimer, the term of this patent is extended or adjusted under 35 U.S.C. 154(b) by 0 days.

(21) Appl. No.: 16/228,899

(22) Filed: Dec. 21, 2018

(65) Prior Publication Data

US 2020/0200130 A1    Jun. 25, 2020

(51) Int. Cl.
*F02M 37/00* (2006.01)
*F02M 55/04* (2006.01)
*F16F 15/02* (2006.01)
*F02M 69/46* (2006.01)

(52) U.S. Cl.
CPC ........ *F02M 37/0041* (2013.01); *F02M 55/04* (2013.01); *F02M 69/465* (2013.01); *F16F 15/02* (2013.01); *F02M 2200/04* (2013.01)

(58) Field of Classification Search
CPC .. F02M 37/0041; F02M 55/04; F02M 69/465; F02M 2200/04; F16F 15/02
USPC .................................................. 123/456, 447
See application file for complete search history.

(56) References Cited

U.S. PATENT DOCUMENTS

| | | | |
|---|---|---|---|
| 5,056,489 A | 10/1991 | Lorraine | |
| 5,575,262 A | 11/1996 | Rohde | |
| 5,617,827 A | 4/1997 | Eshleman et al. | |
| 6,205,979 B1 | 3/2001 | Sims, Jr. et al. | |
| 6,390,131 B1 | 5/2002 | Kilgore | |
| 6,418,909 B2 | 7/2002 | Rossi et al. | |
| 6,463,911 B1 * | 10/2002 | Treusch | F02M 55/04 |
| | | | 123/456 |
| 6,513,500 B2 | 2/2003 | Braun et al. | |
| 6,640,783 B2 | 11/2003 | Braun et al. | |
| 6,655,354 B2 | 12/2003 | Curran et al. | |
| 6,708,670 B2 | 3/2004 | Treusch et al. | |
| 6,915,786 B2 | 7/2005 | Alder et al. | |
| 6,935,314 B2 | 8/2005 | Zdroik et al. | |
| 6,978,765 B2 | 12/2005 | Kilgore | |
| 7,520,268 B1 | 4/2009 | Sims, Jr. | |

(Continued)

*Primary Examiner* — Mahmoud Gimie
(74) *Attorney, Agent, or Firm* — Kelly McGlashen; Maginot, Moore & Beck LLP (57) ABSTRACT

A fuel injection system includes a fuel rail, and a damper that is disposed inside the fuel rail. The damper includes outwardly protruding first barbs formed integrally on one end of the damper and outwardly protruding second barbs formed integrally on an opposed end of the damper. The first barbs and the second barbs each engage the fuel rail inner surface, whereby the damper is located and retained within the fuel rail. The first barbs and the second barbs may be generally triangular in profile and each extend at an acute angle relative to the damper longitudinal axis. In addition, the first barbs and the second barbs are each oriented in the same direction relative to the longitudinal direction, whereby the damper is asymmetric when viewed in side view.

25 Claims, 6 Drawing Sheets

(56) References Cited

U.S. PATENT DOCUMENTS

| | | |
|---|---|---|
| 7,694,664 B1 | 4/2010 | Sims, Jr. |
| 9,518,544 B2 | 12/2016 | Bartell et al. |
| 2017/0234282 A1 | 8/2017 | Wang et al. |
| 2018/0274507 A1* | 9/2018 | Kubota ................ F02M 55/025 |

* cited by examiner

FUEL RAIL DAMPER WITH LOCATING FEATURES

BACKGROUND

A vehicle fuel rail is a conduit that supplies fuel to a plurality of fuel injectors. The fuel injectors inject fuel directly or indirectly into corresponding combustion chambers of the engine. Electromagnetic fuel injectors deliver fuel to the engine in metered pulses that are appropriately timed to the operation of the engine. In some circumstances, the sequential energization of the fuel injectors induces pressure pulsations within the fuel rail. The pressure pulsations can result in improper fuel distribution to the injectors, and fuel line hammering which results in vibration and audible noise.

To reduce or eliminate the pressure pulsations, a damper may be disposed inside the vehicle fuel rail. In some systems, the damper is located and retained within the vehicle fuel rail via elastic retaining elements that are secured to the ends of the damper and suspend the damper within the fuel rail. In some devices, the elastic retaining elements are spring and/or wire retainers that protrude from each end of the damper in such a way as to be symmetric about a midline of the damper. However, the spring and/or wire retainers may become dislodged during assembly with the fuel rail. This is because the damper leading end may be designed for insertion into an open end of the fuel rail, but the damper trailing end, which has a mirrored configuration, may experience interference with the fuel rail open end. In addition, the spring and/or wire retainers may also become dislodged during transportation whereby the trailing end retainer may be lost, requiring re-work via removal of the damper from the fuel rail. If the dislodged retainer is left within the repaired fuel rail, additional issues may arise related to increased noise, leakage and/or distortion. A fuel rail damper that is easily installed and maintained, and avoids the possibility of dislodged parts, is desired.

SUMMARY

In some aspects, a damper is configured to be disposed inside a conduit. The damper includes a first end, a second end is opposed to the first end, a mid portion that is hollow and is disposed between the first end and the second end, a longitudinal axis that extends through the first end and the second end, first retainers disposed on the first end, and second retainers disposed on the second end. The first retainers have the same structure as the second retainers, and are configured to retain the damper within the conduit. In addition, the damper is asymmetric about an axis that is perpendicular to the longitudinal axis and that passes through a point mid way between the first end and the second end.

In some embodiments, the first retainers include outwardly protruding triangular first barbs that are configured to engage an inner surface of the conduit, and the second retainers include outwardly protruding triangular second barbs that are configured to engage an inner surface of the conduit. In addition, the first barbs and the second barbs each extend at an acute angle relative to the longitudinal axis, and the first barbs and the second barbs are each oriented in the same direction relative to the longitudinal direction.

In some embodiments, the first barbs and the second barbs each comprise a generally triangular profile when viewed in a direction perpendicular to the longitudinal axis.

In some embodiments, the first barbs and the second barbs each include a base that is integral with a wall of the damper, and a vertex that is spaced apart from the base and overlies the wall of the damper.

In some embodiments, the mid portion has a first cross-sectional dimension, the first end and the second end each have a corresponding second cross-sectional dimension that is greater than the first cross-sectional dimension, and the first barbs and the second barbs each have a corresponding third cross-sectional dimension that is greater than the second cross-sectional dimension.

In some embodiments, the first barbs include a first alpha barb, and a first beta barb. The first alpha barb and the first beta barb are disposed between the first end and the mid portion. In addition the first alpha barb and the first beta barb are disposed on opposed sides of the damper, and aligned along a first axis that is perpendicular to the longitudinal axis. The second barbs include a second alpha barb, and a second beta barb. The second alpha barb and the second beta barb are disposed between the second end and the mid portion. In addition, the second alpha barb and the second beta barb are disposed on opposed sides of the damper, and aligned along a second axis that is perpendicular to the longitudinal axis.

In some embodiments, the first retainers are disposed between the first end and the mid portion, and the second retainers are disposed between the second end and the mid portion.

In some embodiments, the first end, the second end, the mid portion, the first retainers and the second retainers are integrally formed.

In some embodiments, the mid portion has a closed sectional shape, as seen when the damper is viewed in a first cross section that is perpendicular to the longitudinal axis, where the first cross section is taken in the mid portion. The first end includes a first plate portion, as seen when the damper is viewed in a second cross section that is perpendicular to the longitudinal axis, where the second cross section is taken between the first end and the mid portion, the first plate portion having first longitudinal edges that extend between the first end and the mid portion. In addition, the second end includes a second plate portion, as seen when the damper is viewed in a third cross section that is perpendicular to the longitudinal axis, where the third cross section is taken between the second end and the mid portion, the second plate portion having second longitudinal edges that extend between the second end and the mid portion. The first retainers protrude outwardly from the first longitudinal edges, and the second retainers protrude outward from the second longitudinal edges.

In some embodiments, the damper comprises a first weld that is disposed in the first plate portion and extends between the first longitudinal edges; and a second weld that is disposed in the second plate portion and extends between the second longitudinal edges. The first retainers are disposed between the first end and the first weld, and the second retainers are disposed between the second end and the second weld.

In some aspects, a fuel injection system includes a fuel rail, and a damper disposed inside the fuel rail. The fuel rail has an inner surface. The damper includes a first end, a second end is opposed to the first end, a mid portion that is hollow and is disposed between the first end and the second end, a longitudinal axis that extends through the first end and the second end, and an outer surface. The first end includes outwardly protruding first barbs that engage the fuel rail inner surface. The second end includes outwardly protruding second barbs that engage the fuel rail inner surface. In addition, the first barbs and the second barbs each extend at an acute angle relative to the longitudinal axis, and the first barbs and the second barbs are each oriented in the same direction relative to the longitudinal direction.

In some embodiments, the first barbs and the second barbs each comprise a generally triangular profile when viewed in a direction perpendicular to the longitudinal axis.

In some embodiments, the first barbs and the second barbs each include a base that is integral with a wall of the damper, and a vertex that is spaced apart from the base and overlies the wall of the damper.

In some embodiments, the first barbs are disposed between the first end and the mid portion, and the second barbs are disposed between the second end and the midportion.

In some embodiments, the first end, the second end, the mid portion, the first barbs and the second barbs are integrally formed.

In some embodiments, the mid portion has a first cross-sectional dimension, the first end and the second end each have a corresponding second cross-sectional dimension that is greater than the first cross-sectional dimension, and the first barbs and the second barbs each have a corresponding third cross-sectional dimension that is greater than the second cross-sectional dimension.

In some embodiments, the first barbs include a first alpha barb, and a first beta barb. The first alpha barb and the first beta barb are disposed between the first end and the mid portion. In addition, the first alpha barb and the first beta barb are disposed on opposed sides of the damper, and aligned along a first axis that is perpendicular to the longitudinal axis. The second barbs include a second alpha barb, and a second beta barb. The second alpha barb and the second beta barb are disposed between the second end and the mid portion. In addition, the second alpha barb and the second beta barb are disposed on opposed sides of the damper, and aligned along a second axis that is perpendicular to the longitudinal axis.

In some embodiments, the mid portion has a closed sectional shape, as seen when the damper is viewed in a first cross section that is perpendicular to the longitudinal axis, where the first cross section is taken in the mid portion. The first end includes a first plate portion, as seen when the damper is viewed in a second cross section that is perpendicular to the longitudinal axis, where the second cross section is taken between the first end and the mid portion, the first plate portion having first longitudinal edges that extend between the first end and the mid portion. In addition, the second end includes a second plate portion, as seen when the damper is viewed in a third cross section that is perpendicular to the longitudinal axis, where the third cross section is taken between the second end and the mid portion, the second plate portion having second longitudinal edges that extend between the second end and the mid portion. The first barbs protrude outwardly from the first longitudinal edges, and the second barbs protrude outward from the second longitudinal edges.

In some embodiments, the damper includes a first weld that is disposed in the first plate portion and extends between the first longitudinal edges; and a second weld that is disposed in the second plate portion and extends between the second longitudinal edges. The first barbs are disposed between the first end and the first weld, and the second barbs are disposed between the second end and the second weld.

In some aspects, a method of manufacturing a damper for a fluid delivery system includes the following method steps: Providing a tube having a first end, a second end opposed to the first end, a mid portion disposed between the first end and the second end, and a longitudinal axis that extends between the first end and the second end; flattening the tube at the first end to provide a first plate portion at the first end; and flattening the tube at the second end to provide a second plate portion at the second end; welding the first plate portion along a first weld line that is perpendicular to a longitudinal axis of the tube so as to seal the first end; welding the second plate portion along a second weld line that is perpendicular to a longitudinal axis of the tube so as to seal the second end; cutting a first slit in the first plate portion, the first slit intersecting a first peripheral edge portion of the first plate portion and being at an acute angle relative to the longitudinal axis; cutting a second slit in the first plate portion, the second slit intersecting a second peripheral edge portion of the first plate portion and being at the acute angle relative to the longitudinal axis; deforming the tube so that a first portion of the tube between the first slit and the first peripheral edge portion protrudes outward relative to the remaining portions of the first peripheral edge portion; and deforming the tube so that a second portion of the tube between the second slit and the second peripheral edge portion protrudes outward relative to the remaining portions of the second peripheral edge portion.

In some embodiments, the method includes the method steps of providing a fluid conduit of the fluid delivery system; and inserting the tube into the conduit in such a way that a leading end of the tube is inserted before a trailing end of the tube. During the step of inserting the tube into the conduit, the tube is oriented so that the acute angle opens away from the leading end of the tube.

In some embodiments, the first portion of the tube and the second portion of the tube each comprise a generally triangular profile when viewed in a direction perpendicular to the longitudinal axis.

In some embodiments, the first portion of the tube includes a first base that is integral with a wall of the damper and extends between a blind end of the first slit and the first peripheral edge portion; and a first vertex that is spaced apart from the first base, and is spaced apart from, and overlies, the first peripheral edge portion. In addition, the second portion of the tube includes a second base that is integral with a wall of the damper and extends between a blind end of the second slit and the second peripheral edge portion; and a second vertex that is spaced apart from the second base, and is spaced apart from, and overlies, the second peripheral edge portion.

In some embodiments, the method further includes the method steps of cutting a third slit in the second plate portion, the third slit intersecting a third peripheral edge portion of the second plate portion and being at the acute angle relative to the longitudinal axis; cutting a fourth slit in the second plate portion, the fourth slit intersecting a fourth peripheral edge portion of the second plate portion and being at the acute angle relative to the longitudinal axis; deforming the tube so that a third portion of the tube between the third slit and the third peripheral edge portion protrudes outward relative to the remaining portions of the third peripheral edge portion; and deforming the tube so that a fourth portion of the tube between the fourth slit and the fourth peripheral edge portion protrudes outward relative to the remaining portions of the fourth peripheral edge portion.

In some aspects, a method is provided for manufacturing a fluid delivery system that includes a conduit and a damper disposed in the conduit. The method includes the method steps of: manufacturing the damper such that the damper has a leading end, a trailing end that is opposed to the leading end, a first pair of barbs that protrude from a the damper adjacent to the leading end, and a second pair of barbs that protrude from the damper adjacent to the trailing end, wherein each barb of the first pair of barbs and each barb of the second pair of barbs are at an acute angle relative to the longitudinal axis and the acute angle opens toward the trailing end; and inserting the damper into the conduit, in such a way that the leading end is inserted into the conduit before the trailing end is inserted into the conduit.

A fuel rail damper is provided that addresses the deficiencies of some conventional fuel rail dampers. In particular, the damper includes an elongate hollow body that is flattened and sealed at each opposed end. The damper includes locating and retaining features that are formed integrally with the ends. By forming damper so that the locating and retaining features integral with the ends, the cost and complexity of the features and of the damper as a whole are reduced. In addition, the locating features cannot be omitted, dislodged and/or lost during assembly, in shipping or in use.

The locating and retaining features include first retainers disposed on one end of the damper and second retainers disposed on the opposed end. The first retainers have the same structure as the second retainers, and are arranged so that the damper is asymmetric about an axis extending through its mid point. By integrating the first and second retainers in an asymmetrical arrangement, the insertion of the damper in the fuel rail is facilitated, and no special tools or techniques are required for insertion since the first and second retainers have a shape that is designed to provide insertion forces that are low and repeatable. The shape of the first and second retainers is generally triangular when the damper is seen in side view, and, in use, a vertex of the first and second retainers engages an inner surface of the fuel rail. The first and second retainers are arranged so that the vertex of each retainer has a shallow angle of contact relative to the fuel rail inner surface that leads to a wedging effect that minimizes insertion force. In addition, the first and second retainers are angled relative to a longitudinal axis of the damper to provide a rearward-facing barb shape that creates relatively higher removal force by concentrating the force at a small point (e.g., the vertex), reversing the directing of the wedging effect and causing bending and snagging into the fuel rail wall, much like a porcupine quill or barb of a fishing hook. Thus, the angle and orientation of the first and second retainers advantageously locates the damper within the fuel rail and retains the damper in the desired location within the fuel rail while reducing assembly effort and complexity.

DETAILED DESCRIPTION

Figure 1:
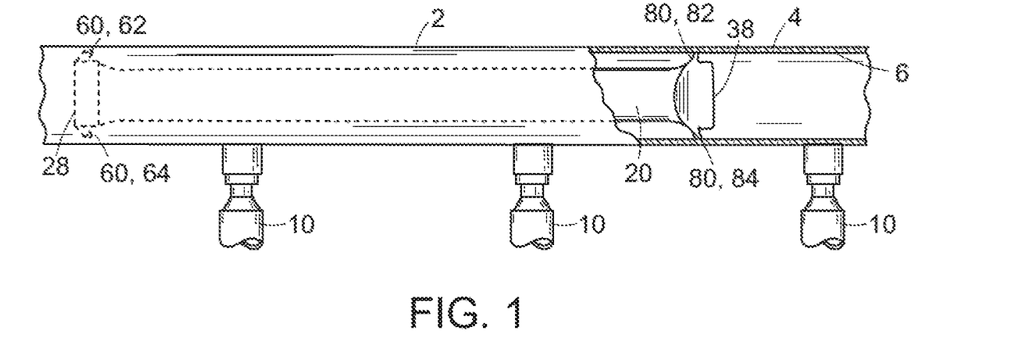
FIG. 1 is a side view in partial cross section illustrating a portion of a fuel system.
Figure 2:
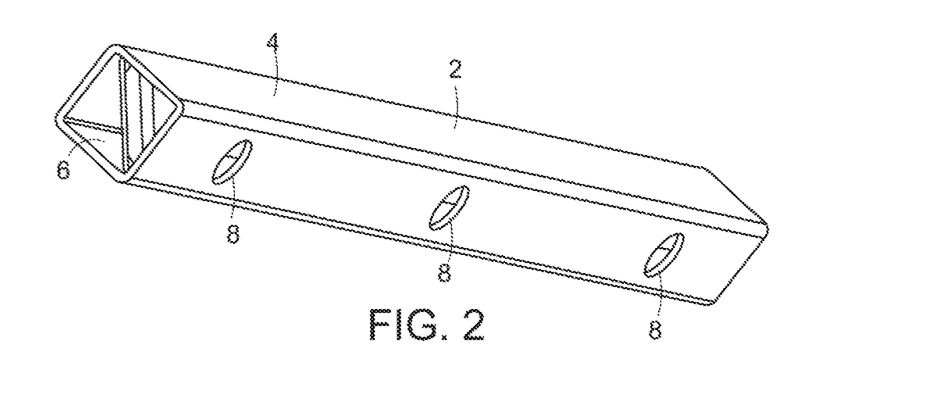
FIG. 2 is a bottom perspective view of a fuel rail illustrating a damper disposed in the fuel rail.
Figure 3:
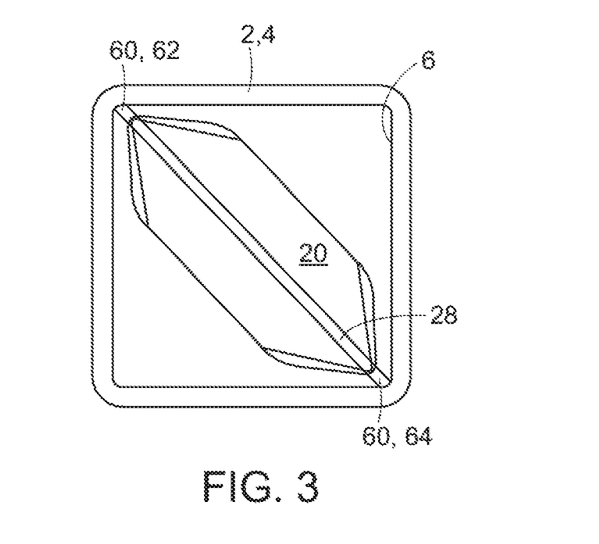
FIG. 3 is an end view of the fuel rail of FIG. 3.

Referring to FIGS. 1-3, a fuel system 1 is used to deliver fuel to the engine (not shown) of a vehicle. The fuel system 1 includes a fuel rail 2, a damper 20 that is disposed inside the fuel rail 2, and fuel injectors 10 that are coupled to the fuel rail 2. The fuel rail 2 is an elongate, rectangular hollow tube that includes a wall 4 that defines a fuel passageway 6. The fuel rail 2 includes fuel outlets 8 formed in the wall that receive the fuel injectors 10. The fuel outlets 8 supply fuel such as gasoline or diesel fuel from the fuel passageway 6 to the engine through the fuel injectors 10. Although three fuel outlets 8 and three fuel injectors 10 are illustrated, the fuel rail may include a greater or fewer number of fuel outlets 8 and fuel injectors 10, and the number of fuel outlets 8 and fuel injectors 10 provided corresponds to the number of fuel injectors and inlet ports of the engine. The damper 20 is located and retained within the fuel rail 2 via retainers 60, 80 provided on each end of the damper 20. The retainers 60, 80 are configured to engage an inner surface of the fuel rail 2, as discussed in detail below.

Figure 4:
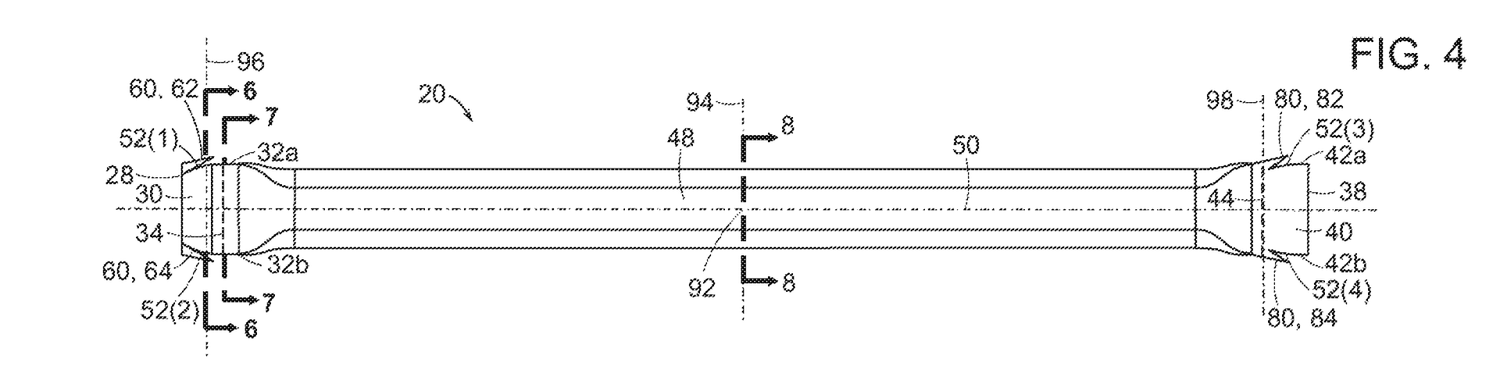
FIG. 4 is a side view of the damper.
Figure 6:
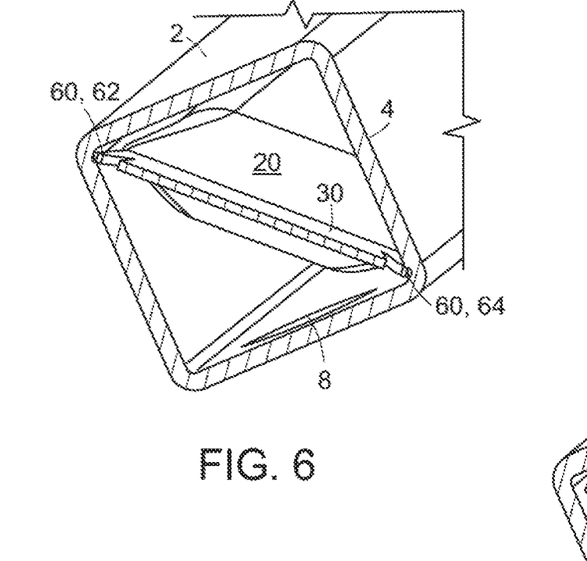
FIG. 6 is a cross-sectional view of the damper as seen along line 6-6 of FIG. 4.
Figure 7:
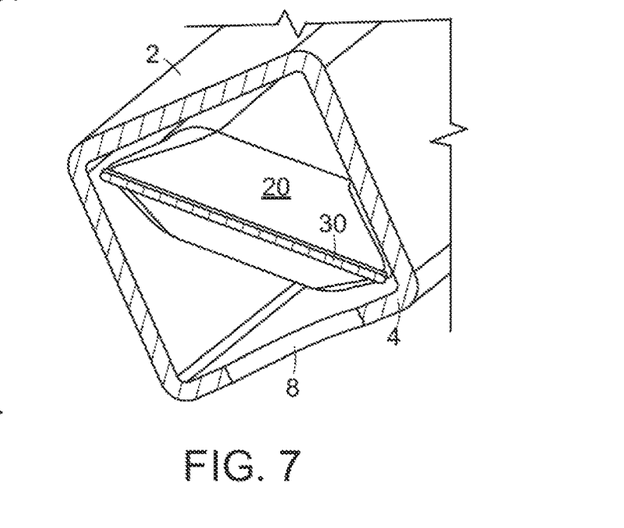
FIG. 7 is a cross-sectional view of the damper as seen along line 7-7 of FIG. 4.
Figure 8:
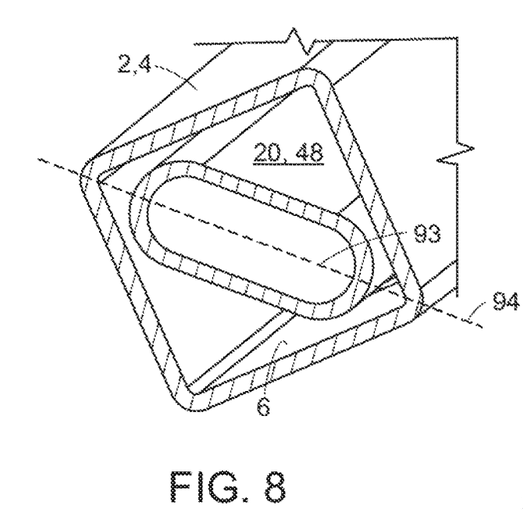
FIG. 8 is a cross-sectional view of the damper as seen along line 8-8 of FIG. 4.
Figure 9:
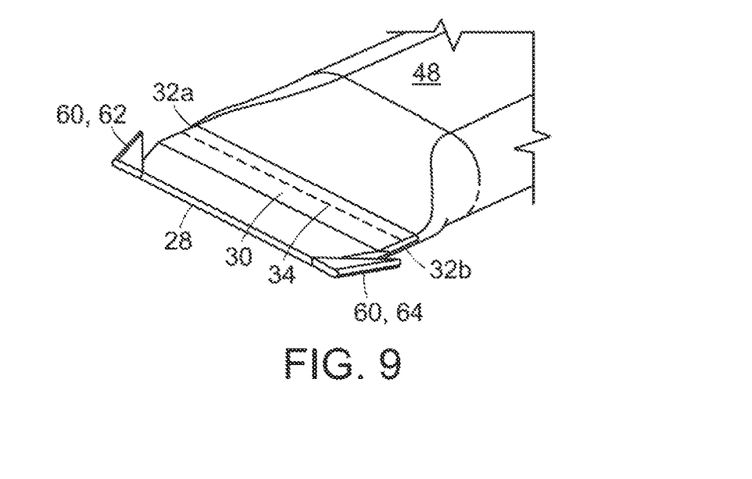
FIG. 9 is a perspective view of an end of the damper.

Referring to FIGS. 4-8, the damper 20 is an elongate body having a first end 28, a second end 38 is opposed to the first end 28, and a mid portion 48 that is hollow and is disposed between the first end 29 and the second end 38. The damper 20 includes a longitudinal axis 50 that extends through the first end 28 and the second end 38. The damper 20 is formed from a tube so that the mid portion 48 has a closed curved section when the damper 20 is viewed in a first cross section that is perpendicular to the longitudinal axis 50, where the first cross section is taken along a first axis 94 that passes through the mid point 92 of the damper 20, where the mid point 92 is mid way between the first end 28 and the second end 38 (FIG. 4). For example, in the illustrated embodiment, the mid portion 48 has a closed oval section, and the first axis 94 is perpendicular to the longitudinal axis 50 and is parallel to the major axis 93 of the closed oval section (FIG. 8).

The first and second ends 28, 38 of the damper 20 are flattened and welded to provide a sealed space within the damper 20. Thus, the damper first end 28 includes a first plate portion 30 that has first longitudinal edges 32a, 32b that extend longitudinally between the first end 28 and the mid portion 48. The damper first end 28 includes a first weld 34 that is disposed between the first end 28 and the mid portion 48. The first weld 34 (shown in broken lines) extends between the first longitudinal edges 32a, 32b and seals the damper first end 28. When the damper 20 is viewed in a second cross section that is perpendicular to the longitudinal axis 50 and that is taken along a second axis 96 that is disposed between the first end 28 and the mid portion 48 and is parallel to the first axis 94, the damper 20 has a plate-shaped section (FIG. 6).

Similarly, the damper second end 38 includes a second plate portion 40 that has second longitudinal edges 42*a*, 42*b* that extend longitudinally between the second end 38 and the mid portion 48. The damper second end 38 includes a second weld 44 (shown in broken lines) that is disposed between the second end 38 and the mid portion 48. The second weld 44 extends between the second longitudinal edges 42*a*, 42*b* and seals the damper second end 38. When the damper 20 is viewed in a third cross section that is perpendicular to the longitudinal axis 50 and that is taken along a third axis 98 that is disposed between the second end 38 and the mid portion 48 and is parallel to the first axis 94, the damper 20 has a plate-shaped section.

The damper 20 includes first retainers 60 that are formed integrally with the first plate portion 30 and disposed between the first end 28 and the first weld 34, and second retainers 80 that are formed integrally with the second plate portion 40, and disposed between the second end 38 and the second weld 44. Thus, the first end 28, the second end 38, the mid portion 48, the first retainers 60 and the second retainers 80 are integrally formed, and the first and second retainers 60, 80 are provided outside of the sealed area defined between the first and second welds 34, 44.

The first retainers 60 include a pair of outwardly protruding first barbs 62, 64 that are configured to engage an inner surface of the fuel rail 2. In addition, the second retainers 80 include a pair of outwardly protruding second barbs 82, 84 that are configured to engage an inner surface of the fuel rail 2.

The pair of first barbs 62, 64 includes a first alpha barb 62 and a first beta barb 64. The first alpha barb 62 protrudes outward from one edge 32*a* of the first longitudinal edges 32*a*, 32*b*. The first beta barb 64 protrudes outward from the opposed edge 32*b* of the first longitudinal edges 32*a*, 32*b*. In particular, the first alpha barb 62 and the first beta barb 64 are disposed between the first end 28 and the first weld 34, and are aligned along the second axis that is perpendicular to the longitudinal axis 50.

The pair of second barbs 82, 84 includes a second alpha barb 82 and a second beta barb 84. The second alpha barb 82 protrudes outward from one edge 42*a* of the second longitudinal edges 42*a*, 42*b*. The second beta barb 84 protrudes outward from the opposed edge 42*b* of the second longitudinal edges 42*a*, 42*b*. In particular, the second alpha barb 82 and the second beta barb 84 are disposed between the second end 38 and the second weld 34, and are aligned along a second axis 96 that is perpendicular to the longitudinal axis 50.

The first barbs 62, 64 and the second barbs 82, 84 are provided by cutting a slit 52 into the respective first or second plate portion 30, 40. The slit 52 intersects the respective first or second longitudinal edge 32, 42 and is disposed at a first acute angle θ1 relative to the longitudinal axis 50. The triangular portion of material disposed between the slit 52 and the first or second longitudinal edge 32, 42 is deformed outwardly, away from the longitudinal axis 50 and the respective first or second plate portion 30, 40 to form a "barb."

The first barbs 62, 64 and the second barbs 82, 84 each have a generally triangular profile when viewed in a direction perpendicular to the longitudinal axis 50. In particular, the first barbs 62, 64 and the second barbs 82, 84 each have a base 54 and a vertex 56. The base 54 is integral with the respective first or second plate portion 30, 40, and generally located along a line that passes through the blind end of the slit 52 and is perpendicular to the respective first or second longitudinal edge 32, 42. The vertex 56 is spaced apart from the base 54 and corresponds to the location where the slit 52 intersects the respective first or second longitudinal edge 32, 42. The vertex 56 is spaced apart from, and overlies, the undeformed portions of the respective first or second longitudinal edge 32, 42, e.g., is spaced apart from, and overlies, the wall of the damper 20.

In addition, the first barbs 62, 64 and the second barbs 82, 84 each extend at a second acute angle θ2 relative to the longitudinal axis 50 and the angle θ2 opens toward the damper second end 38, which corresponds to a trailing end of the damper 20 when the damper 20 is inserted into a conduit such the fuel rail 2. In other words, the first barbs 62, 64 and the second barbs 82, 84 are each oriented in the same direction relative to the longitudinal axis 50, whereby the damper 20 is asymmetric about a third axis 98 that is perpendicular to the longitudinal axis 50 and that passes through the mid point 92. In addition, the vertex 56 of each of the first barbs 62, 64 and the second barbs 82, 84 is angled away from the damper first end 28, or leading end, so as to make extraction of the damper 20 from the fuel rail 2 difficult.

Figure 5:
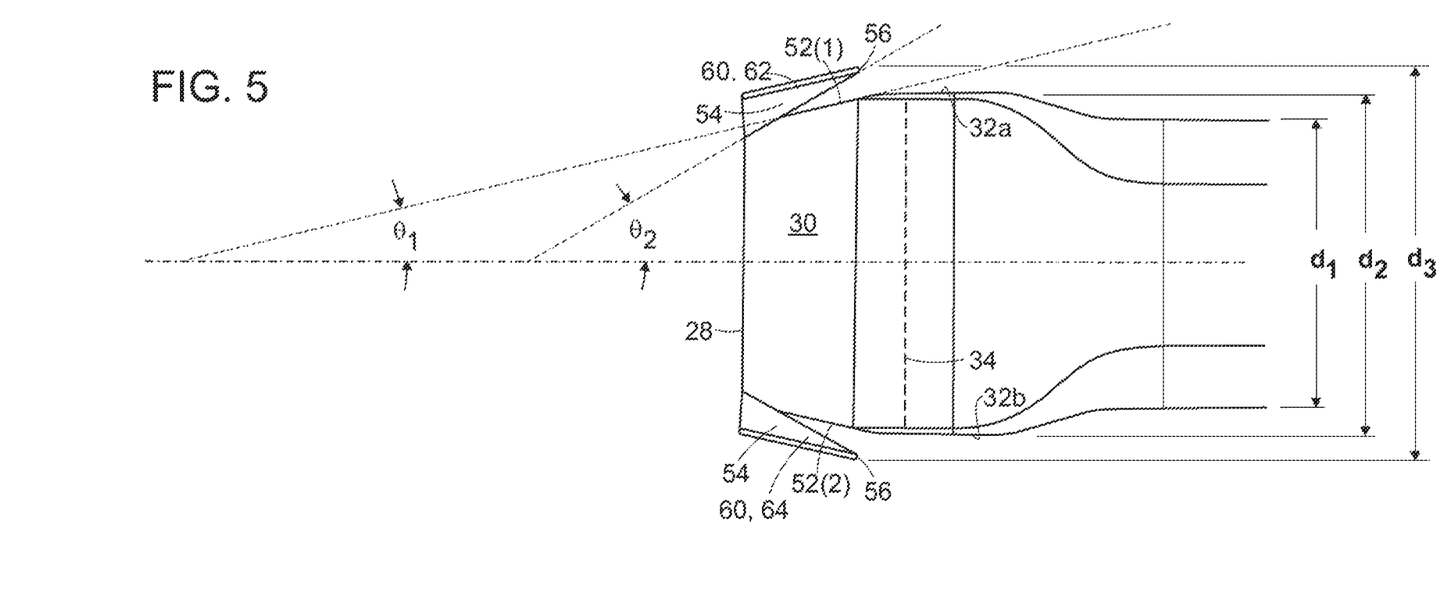
FIG. 5 is side view of an end of the damper.

Referring to FIGS. 4 and 5, the damper 20 has a non-uniform outer diameter. In particular, the damper mid portion 48 has an oval cross sectional shape, and the dimension of the major axis 93 of the oval cross-sectional shape has a first cross sectional dimension (e.g., diameter) d1. The first plate portion 30 of the first end 28 and the second plate portion 40 of the second end 38 each have a corresponding second cross-sectional dimension d2 that is greater than the first cross-sectional dimension d1. In addition, the first barbs 62, 64, which protrude outward from the peripheral edges of the first plate portion 30, and the second barbs 82, 84, which protrude outward from the peripheral edges of the second plate portion 40, each have a corresponding third cross-sectional dimension d3 that is greater than the second cross-sectional dimension d2, where the third cross sectional dimension d3 corresponds to the distance between the vertices 56 of the first barbs 62, 64, and also to the distance between the vertices 56 of the second barbs 82, 84.

In use, the vertices 56 of each of the first barbs 62, 64 and the second barbs 82, 84 engage the inner surface of the fuel rail 2. In the illustrated embodiment, the fuel rail 2 has a square cross-sectional shape. The damper 20 is disposed in the fuel rail 2 in an orientation in which the first, second and third axes 94, 96, 98 are aligned with a diagonal of the fuel rail cross-section, and the first barbs 62, 64 and the second barbs 82, 84 are received in, and engage with, the corners of the fuel rail inner surface. In this configuration, only the first barbs 62, 64 and the second barbs 82, 84 are in contact with the fuel rail inner surface. The remainder of the damper 20, including the first end 28, the first plate portion 30, the mid portion 48, the second plate portion 40 and the second end 38 are spaced apart from the fuel rail inner surface, whereby the damper 20 is suspended within the fuel rail 2 via the first barbs 62, 64 and the second barbs 82, 84 (FIG. 7).

Referring to FIGS. 10-14, a method of manufacturing the damper 20 includes forming integral barbs at each end of the damper, as will now be described in detail.

Figure 10:
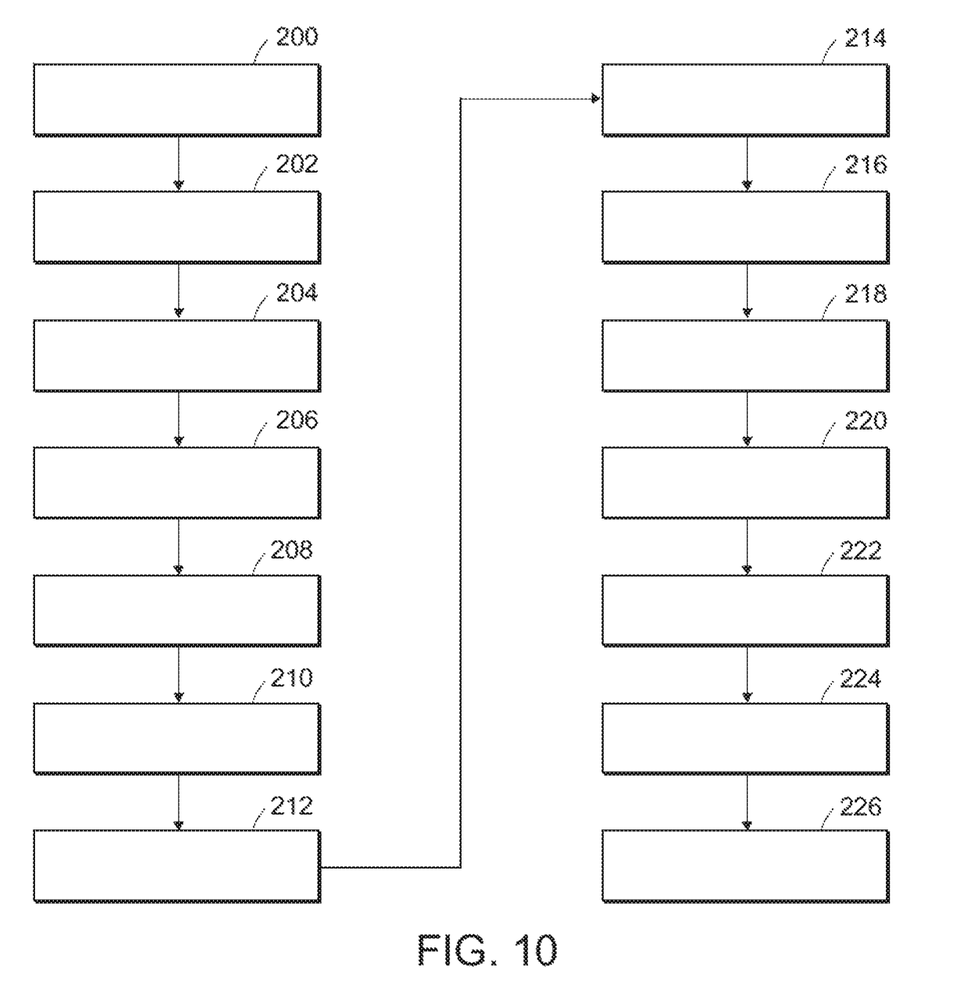
FIG. 10 is a flow chart illustrating a method of manufacturing a damper.
Figure 11:
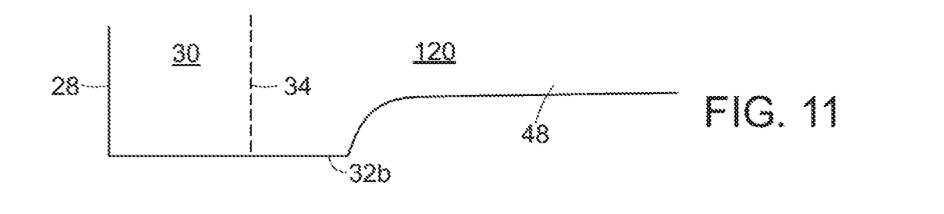
FIG. 11 illustrates a method step of welding an end of the tube used to form the damper.
Figure 12:
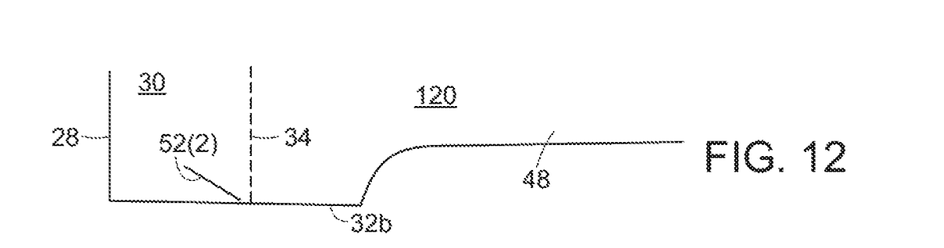
FIG. 12 illustrates a method step of cutting a slot in the tube.
Figure 13:
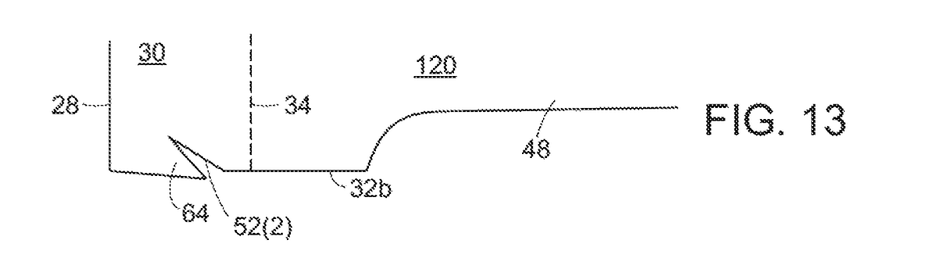
FIG. 13 illustrates a method step of deforming the tube in the vicinity of the slot to form a protrusion.

An initial step of manufacturing the damper 20 includes providing a tube 120 (step 200). The tube 120 may formed by conventional method such as an extrusion process. The tube 120 is elongated, and has a closed curved cross-sectional shape. In the illustrated embodiment, the tube 120 has an oval cross sectional shape including a major axis that is at least twice as long as its minor axis. The tube 120 is cut to a desired length (step 202), which is determined by the requirements of the specific application. As a result of subsequent forming and/or processing steps described below, the tube 120 is transformed into the damper 20. For this reason, the term "tube" will hereinafter be used interchangeably with the term "damper", and common reference numbers are used to refer to common elements.

The tube 120 having the desired length is then processed as follows. The first end 28 of the tube 120 is flattened so as to provide the first plate portion 30 at the first end 28 (step 204). In addition, the second end 38 of the tube 120 is flattened so as to provide the second plate portion 40 (step 206). The first and second ends 28, 38 are flattened in a direction that is perpendicular to both the longitudinal axis 50 and the major axis 93 of the tube cross-section.

After the ends of the tube 120 have been flattened, the first plate portion 30 is welded (step 208, FIG. 11) along a first weld line that is perpendicular to the longitudinal axis 50 of the tube 120 and parallel to the major axis of the tube cross section, so as to seal the first end 28 and provide the first weld 34. The first weld 34 is spaced apart from the first end 28. For example, in the illustrated embodiment, the first weld 34 is disposed in the first plate portion 30 about mid way between the first end 28 and the mid portion 48. In addition, the second plate portion 40 is welded (step 210) along a second weld line that is perpendicular to the longitudinal axis 50 of the tube 120 and parallel to the major axis of the tube cross section, so as to seal the second end 38 and provide the second weld 44. The second weld 44 is spaced apart from the second end 38. For example, in the illustrated embodiment, the second weld 44 is disposed in the second plate portion 40 about mid way between the second end 38 and the mid portion 48.

Subsequent to the ends of the tube 120 being flattened and welded, a first slit 52(1) is formed in the first plate portion 30 via a cutting operation (step 212). The first slit 52(1) intersects one edge 32a of the first longitudinal edges 32a, 32b of the first plate portion 30 and is at the first acute angle $\theta 1$ relative to the longitudinal axis 50. The first alpha barb 62 is provided between the first slit 52(1) and the one edge 32a of the first longitudinal edges 32a, 32b. In addition, a second slit 52(2) is formed in the first plate portion 30 via a cutting operation (step 214, FIG. 12). The second slit 52(2) intersects the opposed edge 32b of the first longitudinal edges 32a, 32b of the first plate portion 30 and is at the first acute angle $\theta 1$ relative to the longitudinal axis 50. The first beta barb 64 is provided between the second slit 52(2) and the opposed edge 32b of the first longitudinal edges 32a, 32b. Although the cutting operations that provide the first and second slits 52(1), 52(2) are described here as being performed in two separate steps 212, 214, it is understood that both the first slit 52(1) and the second slit 52(2) can be cut in a single step by a single tool (i.e., a single punch or knife).

Similarly, a third slit 52(3) is formed in the second plate portion 40 via a cutting operation (step 216). The third slit 52(3) intersects one edge 42a of the second longitudinal edges 42a, 42b of the second plate portion 40 and is at the first acute angle $\theta 1$ relative to the longitudinal axis 50. The second alpha barb 82 is provided between the third slit 52(3) and the one edge 42a of the second longitudinal edges 42a, 42b. In addition, a fourth slit 52(4) is formed in the second plate portion 40 via a cutting operation (step 218). The fourth slit 52(4) intersects the opposed edge 42b of the second longitudinal edges 42a, 42b of the second plate portion 40 and is at the first acute angle 91 relative to the longitudinal axis 50. The second beta barb 84 is provided between the fourth slit 52(4) and the opposed edge 42b of the second longitudinal edges 42a, 42b. Although the cutting operations that provide the third and fourth slits 52(3), 52(4) are described here as being performed in two separate steps 216, 218, it is understood that both the third slit 52(3) and the fourth slit 52(4) can be cut in a single step by a single tool (i.e., a punch or knife, not shown). In some embodiments, the same tool may be used in one step to form the first and second slits 52(1), 52(2), and then in a subsequent step to form the third and fourth slits 52(3), 52(4), for example following translation of the tube 120 relative to the tool.

After the slits 52(1), 52(2), 52(3), 52(4) have been cut, the tube 120 is deformed so that the first barbs 62, 64 are made to protrude outward. In particular, the tube 120 is deformed in the vicinity of the first slit 52(1) so that a first portion of the tube (e.g., the first alpha barb 62 between the first slit 52(1) and the one edge 32a) protrudes outward relative to the remaining portions of the one edge 32a (step 220). In addition, the tube 120 is deformed in the vicinity of the second slit 52(2) so that a second portion of the tube (e.g., the first beta barb 64 between the second slit 52(2) and the opposed edge 32b) protrudes outward relative to the remaining portions of the opposed edge 32b (step 222, FIG. 13).

The tube 120 is further deformed so that the second barbs 82, 84 are made to protrude outward. In particular, the tube 120 is deformed in the vicinity of the third slit 52(3) so that a third portion of the tube (e.g., the second alpha barb 82 between the third slit 52(3) and the one edge 42a) protrudes outward relative to the remaining portions of the one edge 42a (step 224). In addition, the tube 120 is deformed in the vicinity of the fourth slit 52(4) so that a fourth portion of the tube (e.g., the second beta barb 84 between the fourth slit 52(4) and the opposed edge 42b) protrudes outward relative to the remaining portions of the opposed edge 42b (step 226).

Prior to deformation, the orientation of the first barbs 62, 64 and the second barbs 82, 84 corresponds to the orientation of the slits 52(1), 52(2), 52(3) 52(4), and thus the first barbs 62, 64 and the second barbs 82, 84 are oriented at the first acute angle $\theta 1$ relative to the longitudinal axis 50. In some embodiments, the first acute angle $\theta 1$ is in a range of 5 degrees to 85 degrees relative to the longitudinal axis 50. In the illustrated embodiment, the first acute angle $\theta 1$ is about 30 degrees relative to the longitudinal axis 50.

As a result of the deforming steps 220, 222, 224, 226, the angle between the respective barbs 62, 64, 82, 84 and the longitudinal axis is widened or enlarged. That is, following the deforming steps 220, 222, 224, 226, the first barbs 82, 84 and the second barbs 82, 84 are at a second acute angle $\theta 2$ relative to the longitudinal axis 50, where the second acute angle $\theta 2$ is greater than the first acute angle $\theta 1$ by about 5 degrees to 20 degrees. In some embodiments, the second acute angle $\theta 2$ is in a range of 20 degrees to 70 degrees relative to the longitudinal axis. In the illustrated embodiment, the second acute angle $\theta 2$ is about 45 degrees.

The length of the cut, location of the cut, and cut angle (e.g., angle $\theta 1$) determine the size and position of the first barbs 62, 64 and the second barbs 82, 84. The desired interference force is developed by the cutting and deforming steps. Adjustment of the interference forces is simple, and is based on the length of the cut, and cut angle (e.g., angle $\theta 1$) and angle after deformation (e.g., angle $\theta 2$).

Although all of the deforming steps 220, 222, 224, 226 are described herein as following all of the cutting steps 212, 214, 216, 218, it is understood that the method is not limited to this sequence of steps. For example, in some embodiments, the first cutting step 212 may be followed by the first deforming step 220, the second cutting step 214 may follow the first deforming step 220, and be followed by the second deforming step, etc. In other embodiments, two cutting steps 212, 214 may be performed on the first end 28, followed by performing two deformation steps 220, 222 on the first end 28, and then two cutting steps 216, 218 may be performed on the second end 38, followed by performing the remaining two deformation steps 224, 226 on the second end 38.

Figure 14:
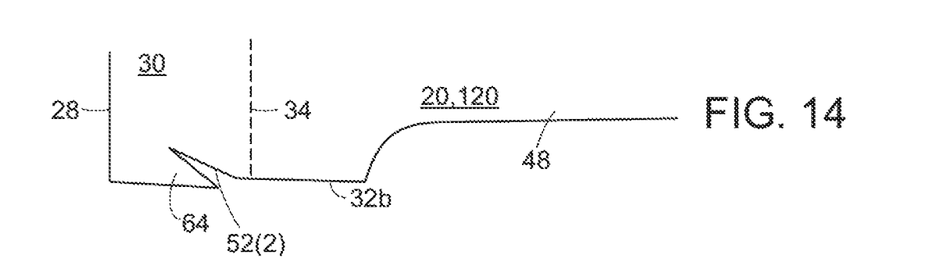
FIG. 14 illustrates a method step of deburring a vertex of the protrusion.

In some embodiments, the vertices 36 of each of the first barbs 62, 64 and the second barbs 82, 84 may be dressed from as-formed sharp to rounded as needed via, for example, deburring (FIG. 14). The exact final shape of the vertices is determined by the requirements of handling, longevity and force concentration.

As a result of the above steps 200-226, the tube 120 is transformed into the damper 20 having integral first barbs 62, 64 and integral second barbs 82, 84. The first barbs 62, 64 and the second barbs 82, 84 protrude rigidly from the respective first and second plate portions 30, 40, but are sufficiently compliant to allow slight deflection during assembly with the fuel rail 2 of the fuel system 1. The first barbs 62, 64 and the second barbs 82, 84 are sufficiently rigid to generate a normal force with respect to the fuel passageway inner surface to suspend the damper 20 therein, and to retain the damper in the suspended desired configuration and location under applied external environmental forces due to vibration, heat, fuel motion within the passageway 6, etc. In addition, first barbs 62, 64 and the second barbs 82, 84 are sufficiently rigid to engage with (e.g., snag into) the fuel passageway inner surface in the manner of the barb of a fishing hook.

Figure 15:
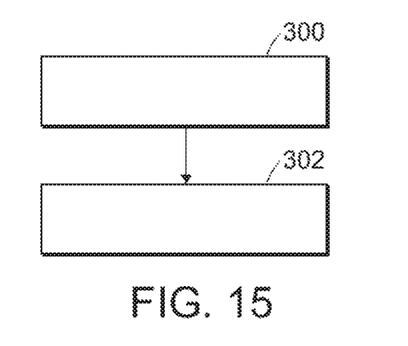
FIG. 15 is a flow chart illustrating a method of manufacturing a fluid delivery system.

Referring to FIG. 15, a method of manufacturing a fluid delivery system that includes a conduit and a damper disposed in the conduit, as will now be described in detail.

Once the damper 20 has been fabricated (step 300), it can be assembled with the fuel system 1. This can be accomplished by inserting the damper 20 into the fuel passageway 6 of the fuel rail 2 (step 302). In particular, the first end 28, corresponding to the leading end, of the damper 20 is inserted into an open end of the fuel rail 2, followed by insertion of the second end 38, corresponding to the trailing end, of the damper 20. Because the first barbs 62, 64 and the second barbs 82, 84 each open toward the second end 38, the damper is easily inserted into the fuel rail 2. Once the damper 20 has been inserted into the fuel rail 2, it is difficult to withdraw the damper 20 from the fuel rail 2 via the open end since the first barbs 62, 64 and the second barbs 82, 84 engage with and snag upon the fuel rail inner surface. The open end of the fuel rail 2 is then closed to complete the rail system as is customary.

Figure 16:
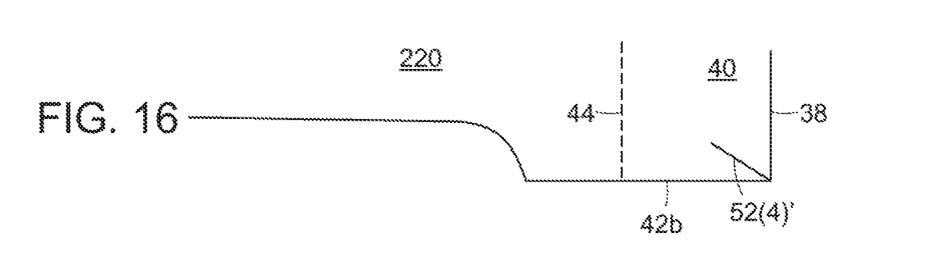
FIG. 16 illustrates an alternative location for cutting a slot in the tube.
Figure 17:
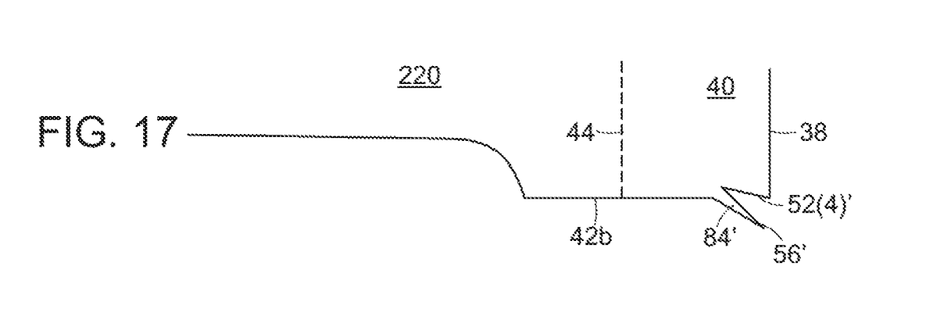
FIG. 17 illustrates the alternative protrusion (barb) resulting from the slot of FIG. 16.
Figure 18:
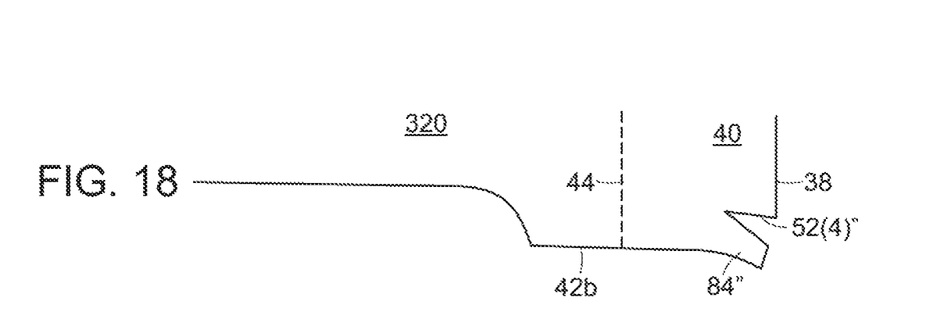
FIG. 18 illustrates another alternative protrusion (barb).

In the embodiment illustrated in FIGS. 1-9, each of the slits 52(1), 52(2), 52(3), 52(4) is cut so as to intersect a longitudinal edge 32a, 32b, 42a, 42b of a respective plate portion 30, 40. However, in some alternative embodiments, a tube 220 includes second barbs 82' (not shown), 84' that are formed on the second end 38 (trailing end) by cutting a slit 52(3)'(not shown), 52(4)' in the second end 38 (FIG. 16), and then deforming the tube 220 so that the second barbs 82'(not shown), 84' are made to protrude outward (FIG. 17). In the embodiment shown in FIG. 16, the slit 52(4)' intersects the second end 38 at the corner of the plate portion 40, providing a sharp vertex 56'. However, the 52(3)'(not shown), 52(4)' may be cut in the second end 38 at a location closer to the midline of the tube 320, resulting in barbs 82" (not shown), 84" having a rectangular profile rather than triangular profile (FIG. 18).

Although the fuel rail 2 of the illustrated embodiment is a tube that has a square cross-sectional shape, the fuel rail 2 is not limited to having a square cross-sectional shape. For example, in other embodiments, the cross-section of the fuel rail 2 may have another closed polygonal shape (i.e., triangular, pentagonal, etc.) or may have a closed curved shape (i.e., circular, oval, irregular, etc.), as determined by the requirements of the specific application.

Although the damper is described herein as being used within a fuel rail of a vehicle fuel injection system, the damper is not limited to this application. For example, the damper may be used in the conduits of other types fluid delivery systems such as used in commercial or residential plumbing systems, medical devices, drilling equipment, etc., to reduce pressure pulsations that lead to unwanted vibration and noise.

We claim:

1. A damper configured to be disposed inside a conduit, the damper including
   a first end;
   a second end is opposed to the first end;
   a mid portion that is hollow and is disposed between the first end and the second end;
   a longitudinal axis that extends through the first end and the second end;
   first retainers disposed on the first end; and
   second retainers disposed on the second end,
   wherein
      the first retainers have the same structure as the second retainers, and are configured to retain the damper within the conduit,
   and
      the damper is asymmetric about an axis that is perpendicular to the longitudinal axis and that passes through a point mid way between the first end and the second end.

2. The damper of claim 1, wherein
   the first retainers include outwardly protruding triangular first barbs that are configured to engage an inner surface of the conduit,
   the second retainers include outwardly protruding triangular second barbs that are configured to engage an inner surface of the conduit, and
   the first barbs and the second barbs each extend at an acute, angle relative to the longitudinal axis, and the first barbs and the second barbs are each oriented in the same direction relative to the longitudinal direction.

3. The damper of claim 2, wherein the first barbs, and the second barbs each comprise a generally triangular profile when viewed in a direction perpendicular to the longitudinal axis.

4. The damper of claim 2, wherein the first barbs and the second barbs each comprise:
   a base that is integral with a wall of the damper; and
   a vertex that is spaced apart from the base and overlies the wall of the damper.

5. The damper of claim 2, wherein
   the mid portion has a first cross-sectional dimension,
   the first end and the second end each have a corresponding second cross-sectional dimension that is greater than the first cross-sectional dimension, and
   the first barbs and the second barbs each have a corresponding third cross-sectional dimension that is greater than the second cross-sectional dimension.

6. The damper of claim 2, wherein
the first barbs comprise:
a first alpha barb; and
a first beta barb, the first alpha barb and the first beta barb being disposed between the first end and the mid portion, disposed on opposed sides of the damper, and aligned along a first axis that is perpendicular to the longitudinal axis, and
the second barbs comprise:
a second alpha barb; and
a second beta barb, the second alpha barb and the second beta barb being disposed between the second end and the mid portion, disposed on opposed sides of the damper, and aligned along a second axis that is perpendicular to the longitudinal axis.

7. The damper of claim 1, wherein the first retainers are disposed between the first end and the mid portion, and the second retainers are disposed between the second end and the mid portion.

8. The damper of claim 1, wherein the first end, the second end, the mid portion, the first retainers and the second retainers are integrally formed.

9. The damper of claim 1, wherein
the mid portion has a closed sectional shape, as seen when the damper is viewed in a first cross section that is perpendicular to the longitudinal axis, where the first cross section is taken in the mid portion;
the first end includes a first plate portion, as seen when the damper is viewed in a second cross section that is perpendicular to the longitudinal axis, where the second cross section is taken between the first end and the mid portion, the first plate portion having first longitudinal edges that extend between the first end and the mid portion; and
the second end includes a second plate portion, as seen when the damper is viewed in a third cross section that is perpendicular to the longitudinal axis, where the third cross section is taken between the second end and the mid portion, the second plate portion having second longitudinal edges that extend between the second end and the mid portion,
and wherein
the first retainers protrude outwardly from the first longitudinal edges, and
the second retainers protrude outward from the second longitudinal edges.

10. The damper of claim 9, wherein the damper comprises
a first weld that is disposed in the first plate portion and extends between the first longitudinal edges; and
a second weld that is disposed in the second plate portion and extends between the second longitudinal edges,
and wherein
the first retainers are disposed between the first end and the first weld, and
the second retainers are disposed between the second end and the second weld.

11. A fuel injection system comprising a fuel rail and a damper disposed inside the fuel rail,
the fuel rail having an inner surface;
the damper including
a first end;
a second end is opposed to the first end;
a mid portion that is hollow and is disposed between the first end and the second end,
a longitudinal axis that extends through the first end and the second end, and
an outer surface,
wherein
the first end includes outwardly protruding first barbs that engage the fuel rail inner surface,
the second end includes outwardly protruding second barbs that engage the fuel rail inner surface, and
the first barbs and the second barbs each extend at an acute angle relative to the longitudinal axis, and the first barbs and the second barbs are each oriented in the same direction relative to the longitudinal direction.

12. The damper of claim 11, wherein the first barbs and the second barbs each comprise a generally triangular profile when viewed in a direction perpendicular to the longitudinal axis.

13. The damper of claim 11, wherein the first barbs and the second barbs each comprise:
a base that is integral with a wall of the damper; and
a vertex that is spaced apart from the base and overlies the wall of the damper.

14. The damper of claim 11, wherein the first barbs are disposed between the first end and the mid portion, and the second barbs are disposed between the second end and the midportion.

15. The damper of claim 11, wherein the first end, the second end, the mid portion, the first barbs and the second barbs are integrally formed.

16. The damper of claim 11, wherein
the mid portion has a first cross-sectional dimension,
the first end and the second end each have a corresponding second cross-sectional dimension that is greater than the first cross-sectional dimension, and
the first barbs and the second barbs each have a corresponding third cross-sectional dimension that is greater than the second cross-sectional dimension.

17. The damper of claim 11, wherein
the first barbs comprise:
a first alpha barb; and
a first beta barb, the first alpha barb and the first beta barb being disposed between the first end and the mid portion, disposed on opposed sides of the damper, and aligned along a first axis that is perpendicular to the longitudinal axis, and
the second barbs comprise:
a second alpha barb; and
a second beta barb, the second alpha barb and the second beta barb being disposed between the second end and the mid portion, disposed on opposed sides of the damper, and aligned along a second axis that is perpendicular to the longitudinal axis.

18. The damper of claim 11, wherein
the mid portion has a closed sectional shape, as seen when the damper is viewed in a first cross section that is perpendicular to the longitudinal axis, where the first cross section is taken in the mid portion;
the first end includes a first plate portion, as seen when the damper is viewed in a second cross section that is perpendicular to the longitudinal axis, where the second cross section is taken between the first end and the mid portion, the first plate portion having first longitudinal edges that extend between the first end and the mid portion; and
the second end includes a second plate portion, as seen when the damper is viewed in a third cross section that is perpendicular to the longitudinal axis, where the third cross section is taken between the second end and the mid portion, the second plate portion having second longitudinal edges that extend between the second end and the mid portion, and wherein the first barbs protrude outwardly from the first longitudinal edges, and the second barbs protrude outward from the second longitudinal edges.

19. The damper of claim 18, wherein the damper comprises a first weld that is disposed in the first plate portion and extends between the first longitudinal edges; and a second weld that is disposed in the second plate portion and extends between the second longitudinal edges, and wherein the first barbs are disposed between the first end and the first weld, and the second barbs are disposed between the second end and the second weld.

20. A method of manufacturing a damper for a fluid delivery system, including the method steps of:

providing a tube having a first end, a second end opposed to the first end, a mid portion disposed between the first end and the second end, and a longitudinal axis that extends between the first end and the second end;

flattening the tube at the first end to provide a first plate portion at the first end; and flattening the tube at the second end to provide a second plate portion at the second end;

welding the first plate portion along a first weld line that is perpendicular to a longitudinal axis of the tube so as to seal the first end;

welding the second plate portion along a second weld line that is perpendicular to a longitudinal axis of the tube so as to seal the second end;

cutting a first slit in the first plate portion, the first slit intersecting a first peripheral edge portion of the first plate portion and being at an acute angle relative to the longitudinal axis;

cutting a second slit in the first plate portion, the second slit intersecting a second peripheral edge portion of the first plate portion and being at the acute angle relative to the longitudinal axis;

deforming the tube so that a first portion of the tube between the first slit and the first peripheral edge portion protrudes outward relative to the remaining portions of the first peripheral edge portion; and deforming the tube so that a second portion of the tube between the second slit and the second peripheral edge portion protrudes outward relative to the remaining portions of the second peripheral edge portion.

21. The method of claim 20, further including the method steps of providing a fluid conduit of the fluid delivery system; and inserting the tube into the conduit in such a way that a leading end of the tube is inserted before a trailing end of the tube, wherein, during the step of inserting the tube into the conduit, the tube is oriented so that the acute angle opens away from the leading end of the tube.

22. The method of claim 20, wherein the first portion of the tube and the second, portion of, the tube each comprise a generally triangular profile when viewed in a direction perpendicular to the longitudinal axis.

23. The method of claim 20, wherein the first portion of the tube comprises:

a first base that is integral with a wall of the damper and extends between a blind end of the first slit and the first peripheral edge portion; and a first vertex that is spaced apart from the first base, and is spaced apart, from, and overlies, the first peripheral edge portion, and the second portion of the tube comprises:

a second base that is integral with a wall of the damper and extends between a blind end of the second slit and the second peripheral edge portion; and a second vertex that is spaced apart from the second base, and is spaced apart from, and overlies, the second peripheral edge portion.

24. The method of claim 20, further including the method steps of cutting a third slit in the second plate portion, the third slit intersecting a third peripheral edge portion of the second plate portion and being at the acute angle relative to the longitudinal axis;

cutting a fourth slit in the second plate portion, the fourth slit intersecting a fourth peripheral edge portion of the second plate portion and being at the acute angle relative to the longitudinal axis;

deforming the tube so that a third portion of the tube between the third slit and the third peripheral edge portion protrudes outward relative to the remaining portions of the third peripheral edge portion; and deforming the tube so that a fourth portion of the tube between the fourth slit and the fourth peripheral edge portion protrudes outward relative to the remaining portions of the fourth peripheral edge portion.

25. A method of manufacturing a fluid delivery system that includes a conduit and a damper disposed in the conduit, the method comprising the method steps of:

manufacturing the damper such that the damper has a leading end, a trailing end that is opposed to the leading end, a first pair of barbs that protrude from a the damper adjacent to the leading end, and a second pair of barbs that protrude from the damper adjacent to the trailing end, wherein each barb of the first pair of barbs and each barb of the second pair of barbs are at an acute angle relative to the longitudinal axis and the acute angle opens toward the trailing end; and inserting the damper into the conduit, in such a way that the leading end is inserted into the conduit before the trailing end is inserted into the conduit.

\* \* \* \* \*